≡ With Cd    ≡ Without Cd

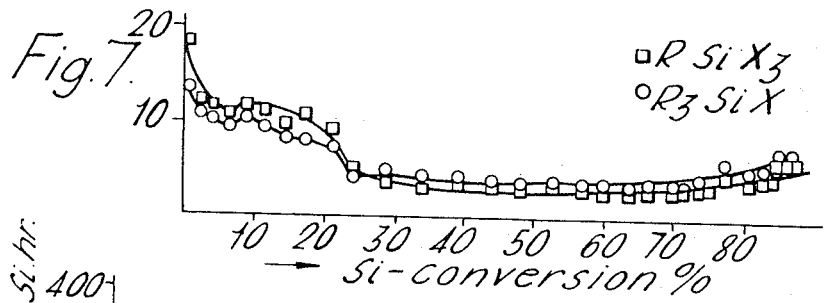
Fig. 7.
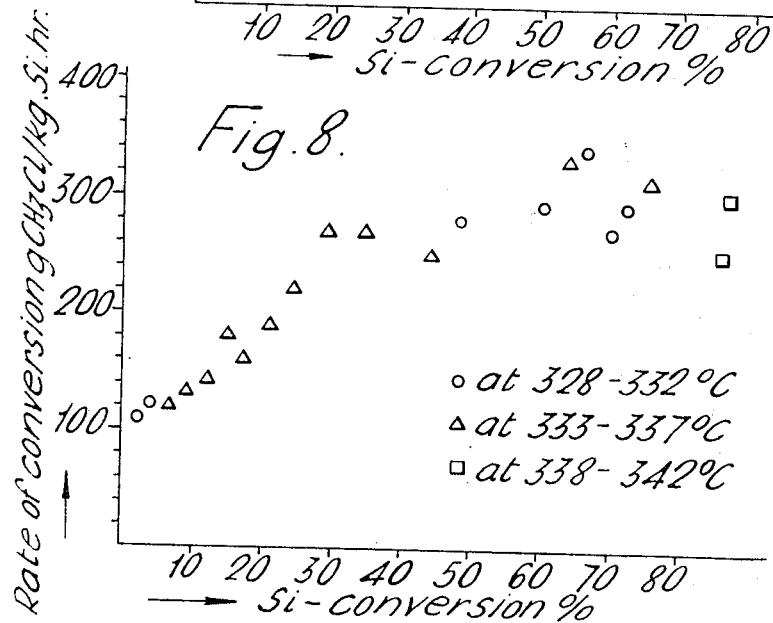
Fig. 8.
○ at 328-332°C
△ at 333-337°C
□ at 338-342°C
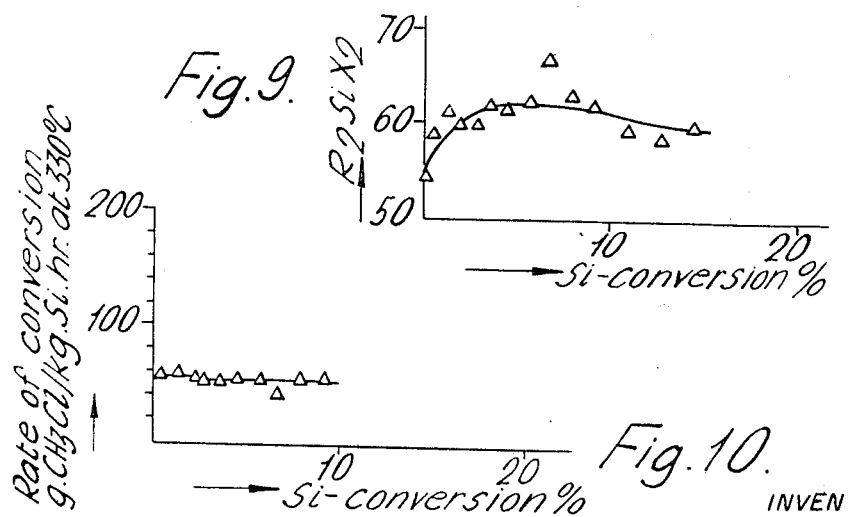
Fig. 9.
Fig. 10.

INVENTORS.
HENDRIK FRITS ZOCK

United States Patent Office 3,446,829
Patented May 27, 1969

3,446,829
CONTACT MASS FOR PREPARING HALOGENO-SILANES AND PROCESS THEREFOR
Hendrik Frits Zock, Vlaardingen, Netherlands, assignor to Lever Brothers Company, New York, N.Y., a corporation of Maine
Filed Jan. 24, 1966, Ser. No. 522,698
Claims priority, application Great Britain, Jan. 27, 1965, 3,718/65
Int. Cl. C07f 7/02
U.S. Cl. 260—448.2                 18 Claims

---

ABSTRACT OF THE DISCLOSURE

This specification is concerned with a contact mass containing silicon, a copper or silver catalyst and a cadmium promoter. This specification is also concerned with the use of this contact mass for the preparation of halogenosilanes.

---

Figure 1:
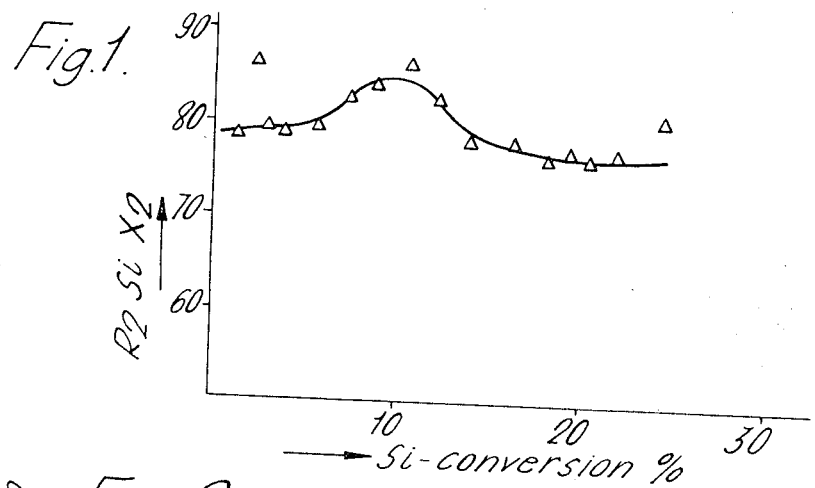

The invention relates to the manufacture of silicon compounds, more particularly of organohalogenosilanes by reaction of silicon with organic halogen compounds.

Organohalogenosilanes, of which certain lower dialkyl-dihalogenosilanes are of commercial value as starting materials for the preparation of silicones (properly organo-siloxane polymers), can be obtained by reacting a hydrocarbon halide RX with a contact mass containing silicon and a metal catalyst such as copper according to the equation:

$$RX + Si \xrightarrow{Cu} R_2SiX_2 \text{ (Rochow synthesis)}$$

Dimethyldichlorosilane, diethyldichlorosilane, methylphenylchlorosilane and diphenyldichlorosilane are compounds of particular commercial importance.

A disadvantage of this process is that the yields of diorganodihalogenosilanes $R_2SiX_2$ tend to be low, especially at high conversion rates of silicon, by-products being formed in substantial proportions. Among these by-products may be found: organotrihalogenosilane $RSiX_3$, triorganohalogenosilane $R_3SiX$ and organodihalogenosilane $RHSiX_2$; less desired are tetrahalogenosilane $SiX_4$, diorganohalogenosilane $R_2HSiX$ and trihalogenosilane $HSiX_3$.

It is believed that several of these by-products form under the influence of the spent contact mass, in particular of the free metallic copper, the content of which in the contact mass, calculated on a percentage basis, is continually increasing as the reaction progresses.

Furthermore under the influence of the spent contact mass, cracking occurs by which tarry products are formed. These tarry products cause a serious decrease in the activity of the contact mass and finally the reaction stops at a relatively low silicon conversion rate.

Various means have therefore been suggested to avoid this cracking action under the influence of copper. Thus it has been suggested to employ a discharge worm in a tube reactor which discharges the consumed material and replaces it continuously with fresh contact material. Besides, the suggestion has been made to add a promoter to the contact mass which results in a decreased tendency towards cracking of the spent catalyst and consequently leads to increased yields of diorganodihalogenosilanes. Various promoters have been suggested, especially zinc and aluminum; however, none of these promoters act entirely satisfactorily.

It has now been found that diorganodihalogenosilanes can be obtained in improved yield by passing the halide over a silicon and catalyst (e.g., copper and silver) containing contact mass in which an amount of cadmium is present. The cadmium may be introduced into the contact mass in elementary form or in the form of a cadmium containing compound, as, e.g., its halides, oxides and the like.

Accordingly the present invention provides a process for the preparation of organohalogenosilanes in which an organohalide is reacted at an elevated temperature with a contact mass containing silicon, a metal catalyst and, as a promoter, cadmium.

This invention also provides an improved contact mass for use in the production of organohalogenosilanes in which the relative quantities of silicon, copper and cadmium calculated as parts by weight of the pure metal are within the following ratios: Cu:Si between 1:150 and 9:11, preferably between 1:100 and 1:10; Cd:Cu between 1:100 and 3:5, preferably between 6:100 and 3:8.

For commercial purposes those contact masses are preferred which are relatively poor in copper and cadmium as far as this is compatible with high selectivity, high reactivity together with high conversion rates.

The manner in which the silicon, the catalyst (copper) and promoter (cadmium) are introduced into the contact mass is not critical. Thus these substances may be present in the contact mass in the form of a mixture of powders of the individual components, or the promoter and the catalyst may be alloyed when possible, powdered and thereafter mixed with the silicon, preferably in the form of a finely-divided powder to give a substantially homogeneous mixture. The processes of mixing and powdering can advantageously be combined by subjecting a solution containing copper ions and cadmium ions to electrolysis which may directly yield a finely divided powder. In a preferred embodiment of the invention the contact mass is stabilized, for example by heating prior to reaction, which improves especially the initial selectivity. Stabilizing of the contact mass can be carried out at temperatures between 250° and 450° C., preferably between 320° and 400° C. For satisfactory stabilizing the contact mass should preferably be heated for 2 to 40 hours. In order to shorten the stabilization period it may be advantageous to prepare an intimate mixture of a cadmium compound and a copper compound prior to stabilization, e.g., by fusion of the copper and cadmium elements or their compounds.

Cadmium as a promoter produces one or more of the following advantages:

(1) It increases the rate of reaction.
(2) It increases the selectivity for the formation of $R_2SiX_2$.
(3) It leads to a more complete consumption of silicon in the contact mass.
(4) At high conversion rates of silicon a high selectivity and rate of reaction is retained.
(5) Preheating of the contact mass with cadmium improves its immediate selectivity and rate of reaction.
(6) The reaction proceeds more smoothly.

The process can be applied for the preparation of dialkyldihalogenosilanes with alkyl groups containing 1 to 3 carbon atoms using, for example, methyl chloride, methyl bromide, ethyl chloride, ethyl bromide, propyl chloride or vinyl chloride as starting material. The invention further provides methods for the preparation of diaryldihalogenosilanes using, for example, phenyl bromide, phenyl chloride or naphthyl chloride as starting material.

Silanes containing different organic radicals such as methylphenyldichlorosilane and methylvinyldichlorosilane are conveniently prepared by using a mixture of different organohalides such as phenyl chloride and methyl chloride or methyl chloride and vinyl chloride as a starting material.

The temperature at which the reaction is suitably carried out varies for alkyl halides between 150 to 480° C., preferably 240 to 380° C., and for aryl halides between 250 to 600° C., preferably 330 to 500° C. The upper limit of the temperature ranges in which the reaction may be carried out is, however, also influenced by the temperature at which the organo halide commences to decompose thermally.

The reaction can be carried out at pressures between 0.1 and 20 kg./cm.$^2$. In the case of reaction with methyl chloride the preferred partial pressure is 4–10 kg./cm.$^2$ because in this pressure range methyl chloride has a boiling point between about 10 and 50° C.

The process of the present invention may be carried out by conducting the halide over and through a bed consisting of the contact mass maintained at the reaction temperature. Another way is to preheat the vapour to the desired temperature before contacting with the contact mass. Once started, the reaction proceeds exothermically. For efficient removal of the reaction heat developed it is advisable to carry out the reaction in a fluidized bed; however the reaction may also be carried out in a fixed-bed reactor. If the formation of $RHSiX_2$ and $HSiX_3$ is desired this may be achieved by introducing a mixture of a hydrogen and an alkyl halide HX and RX into the reactor chamber.

Embodiments of the invention will now be described with reference to the following examples and the accompanying drawings (FIGS. 1 to 12) comprising graphs illustrating the results of the various experiments described in the examples. Percentages refer to percentage by weight.

In these examples the reaction was carried out in the apparatus described below.

The reactor used consisted of a vertical, cylindrical glass tube closed at the lower end and equipped with a heater. It was provided with a vibrator and several thermocouples connected with a temperature recorder, an outlet tube for the gaseous reaction products and an inlet tube for the vaporized organic monohalide which passes through a sintered glass filter plate, the tube having a funnel-shaped end at a short distance above the bottom. In this way the powdered contact mass on the sintered glass plate could be fluidized by means of the halide vapour streaming through the filter plate, the vibrator rendering the fluidization more uniform. The inlet tube was connected with the source of organic monohalide via a drying device and a rotameter. The outlet tube was connected via an electrically heated cyclone (serving to remove dust particles) to a Vigreux column, the top of which was kept at a temperature equal to the boiling point of the hydrocarbon halide. Condensing silanes were allowed to drop into a collecting vessel, the contents of which could be kept on the boil by an electric heating device. Hydrocarbon halide escaping from the top of the column was led into a trap in which it was condensed, collected and measured by volume. The silane mixture thus obtained was weighed and investigated for its content on the various silanes $R_2SiX_2$, $RSiX_3$, $R_3SiX$, $RHSiX_2$, $R_2HSiX$ and $HSiX_3$ by means of gas liquid chromatography.

As the contact mass was easily oxidized and the principal products of the reaction hydrolysable, the reaction conditions were so chosen that no substantial amounts of water and/or oxygen were present. For example, the hydrocarbon halide used contained less than 100 p.p.m. of water and/or oxygen.

The purity of the silicon starting material was about 99%. The main impurities were iron, aluminum, calcium and magnesium. It consisted of fractions of the following particle sizes: 50 to 75 microns (11.7%), 75 to 105 microns (36.9%), 105 to 150 microns (41.4%) and 150 to 210 microns (10.0%). By grinding, the iron content of the silicon had increased to about 2.0%. The iron content of the silicon powder was reduced in a fluidized bed to about 0.2% by means of a magnet. Before use the silicon was always kept for at least 24 hours in a drying oven at about 180° C. In general however, it is not necessary to use silicon of a purity of 99% or above as a starting material. Thus it proved possible to use ferro-silicon containing up to 15% iron as a starting material.

Only dry and white cuprous chloride with a particle size of 2 to 5 microns was used. It was used in powdered mixtures with silicon (and cadmium) after the cuprous chloride had been passed through a 75 micron sieve in order to break-up clustered particles.

The cadmium chloride was, if necessary, freed from water by melting and drying, preferably in the presence of gaseous hydrogen chloride and after cooling powdered in a mortar. Finally, it was passed through a 75 micron sieve. In view of the treatment the cadmium chloride used was considerably coarser than the cuprous chloride.

EXAMPLE 1

The contact mass consisted of 120 g. silicon, 18 g. cuprous chloride and 1 g. cadmium chloride (90.7% Si, 8.8% Cu and 0.5% Cd). The weight ratio cadmium:copper was 5.3:100.

The contact mass was prepared by heating for 1.1 hour at 325° to 350° C. and for 1.2 hours at 350° to 385° C.

The results are given in Table I.

TABLE I

| Test period | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Hours after start | 0.47 | 0.82 | 1.15 | 1.63 | 2.80 | 3.55 | 4.00 | 4.42 | 6.00 | 6.42 | 7.17 | 8.20 | 8.67 | 9.17 | 9.75 | 10.5 | 11.81 |
| Temperature, °C | 340 | 318 | 316 | 318 | 325 | 330 | 330 | 330 | 330 | 326 | 327 | 328 | 329 | 329 | 333 | 338 | 338 |
| Production, g. silane/hr | 10.4 | 12.8 | 9.2 | 5.3 | 8.2 | 12.2 | 19.9 | 20.8 | 16.2 | 18.7 | 16.3 | 13.5 | 11.5 | 12.0 | 11.8 | 13.1 | 12.4 |
| Composition $R_2SiX_2$, percent by weight | | 78.8 | 86.5 | 79.5 | 79.0 | 79.5 | 82.2 | 84.0 | 86.0 | 82.2 | 77.9 | 77.9 | 76.2 | 77.2 | 76.3 | 76.9 | 80.5 |
| Quantity of Si in the bed (g.) | 118.1 | | 116.1 | | 114.1 | | 110.1 | | 106.2 | | 102.1 | | 97.2 | | 94.6 | | 89.9 |
| Rate of conversion, g. $CH_3Cl$/kg. Si/hr | 80 | 100 | 80 | 40 | 60 | 100 | 160 | 170 | 130 | 160 | 140 | 120 | 100 | 110 | 110 | 120 | 120 |
| Si conversion, percent | 0.4 | 1.1 | 2.1 | 2.7 | 3.8 | 5.6 | 7.1 | 8.8 | 10.5 | 12.0 | 13.9 | 16.2 | 18.0 | 19.1 | 20.2 | 21.8 | 24.1 |

After the 8th test period the reactor was cooled to room temperature. The interruption between the 8th and 9th test period lasted for 17.1 hours.

Figure 2:
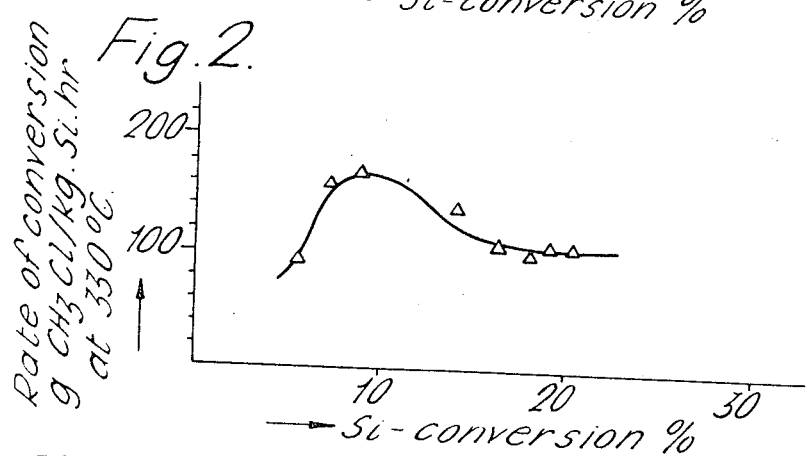

The results are illustrated graphically in FIGURES 1 and 2.

During this experiment it was observed that the ratio $R_3SiX:RSiX_3$ was larger than normal and that there was a temporary increase in selectivity of $R_2SiX_2$ and parallel therewith the reactivity was increased.

EXAMPLE 2

The contact mass consisted of 120 g. silicon, 18 g. cuprous chloride and 4 g. cadmium chloride (89.4% Si, 8.7% Cu and 1.9% Cd). The weight ratio cadmium:copper was 21:100.

The contact mass was prepared by heating for 2.5 hours at 350° C.

The results are given in Table II.

TABLE II

| Test period | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Hours after start | 0.87 | 1.87 | 2.62 | 3.22 | 3.79 | 4.37 | 4.97 | 5.77 | 6.47 | 7.29 | 8.17 | 9.07 | 9.87 | 10.9 |
| Temperature, °C | 330 | 325 | 325 | 331 | 331 | 330 | 331 | 334 | 335 | 338 | 335 | 334 | 338 | 337 |
| Production, g. silanes/hr | 8.6 | 16.5 | 19.1 | 22.8 | 22.7 | 16.6 | 15.6 | 13.4 | 13.5 | 13.7 | 13.7 | 12.8 | 15.2 | 17.1 |
| Composition $R_2SiX_2$, percent by weight | 64.0 | 77.2 | 85.8 | 83.9 | 83.5 | 77.7 | 74.2 | 73.6 | 73.2 | 75.4 | 76.0 | 78.1 | 77.8 | 80.8 |
| $RSiX_3$, percent by wt | 15.4 | 11.3 | 6.0 | 8.0 | 7.6 | 11.6 | 13.5 | 14.6 | 14.4 | 13.3 | 12.5 | 10.8 | 11.3 | 8.5 |
| $R_3SiX$, percent by wt | 20.6 | 11.5 | 8.2 | 8.0 | 8.9 | 10.7 | 12.3 | 11.7 | 12.1 | 11.3 | 11.5 | 11.1 | 10.9 | 10.7 |
| Quantity of Si in the bed (g.) | 117.7 | | 111.7 | | 105.8 | | 101.3 | | 96.9 | | 92.1 | | 86.9 | |
| Rate of conversion g. $CH_3Cl$/kg. Si/hr | 60 | 110 | 130 | 160 | 170 | 130 | 120 | 110 | 110 | 110 | 120 | 110 | 140 | 160 |
| Si conversion, percent | 0.6 | 2.8 | 5.7 | 8.2 | 10.7 | 12.7 | 14.4 | 16.3 | 18.2 | 20.1 | 22.3 | 24.5 | 26.7 | 29.4 |

| Test period | 15 | 16 | 17 | 18 | 19 | 20 | 21 | 22 | 23 | 24 | 25 | 26 | 27 |
|---|---|---|---|---|---|---|---|---|---|---|---|---|---|
| Hours after start | 11.9 | 12.9 | 13.9 | 14.9 | 15.9 | 16.9 | 17.9 | 18.9 | 19.9 | 20.9 | 21.9 | 22.9 | 23.9 |
| Temperature, °C | 338 | 340 | 339 | 339 | 339 | 338 | 341 | 339 | 338 | 338 | 341 | 330 | 346 |
| Production, g. silanes/hr | 20.2 | 22.8 | 24.1 | 22.2 | 21.0 | 19.9 | 18.9 | 17.6 | 15.0 | 14.1 | 13.6 | 9.3 | 12.7 |
| Composition $R_2SiX_2$, percent by wt | 81.2 | 86.8 | 87.8 | 89.8 | 91.3 | 91.9 | 91.9 | 92.0 | 92.9 | 91.8 | 92.0 | 90.5 | 91.2 |
| $RSiX_3$, percent by wt | 9.3 | 5.9 | 6.2 | 6.0 | 5.1 | 4.3 | 4.2 | 4.7 | 3.6 | 4.8 | 4.5 | 4.5 | 4.9 |
| $R_3SiX$, percent by wt | 9.5 | 6.9 | 5.5 | 4.2 | 3.6 | 3.5 | 3.4 | 3.1 | 2.9 | 2.8 | 2.8 | 3.4 | 2.8 |
| Quantity of Si in the bed (g.) | 79.7 | | 70.0 | | 60.6 | | 51.5 | | 43.1 | | 37.8 | | 33.0 |
| Rate of conversion, g. $CH_3Cl$/kg. Si/hr | 200 | 240 | 270 | 270 | 270 | 280 | 290 | 290 | 270 | 270 | 280 | 210 | 300 |
| Si conversion, percent | 32.7 | 36.7 | 40.9 | 45.4 | 48.8 | 53.0 | 56.5 | 59.9 | 63.6 | 65.5 | 68.1 | 70.2 | 72.2 |

The total yield of silanes in this test was 476 g.

Figure 3:
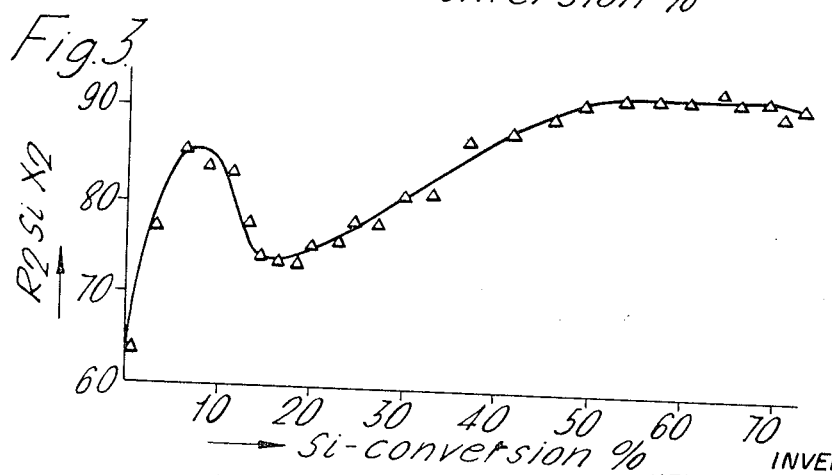
Figure 4:
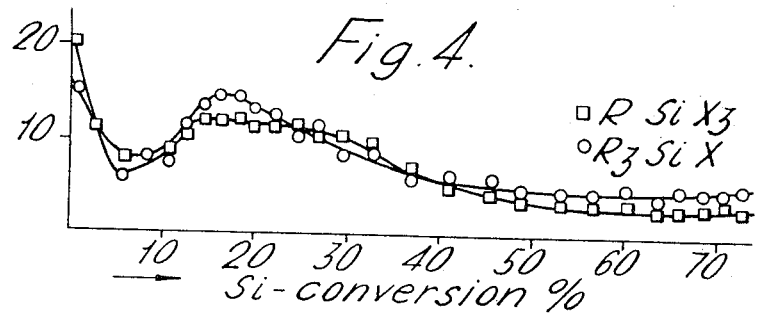
Figure 5:
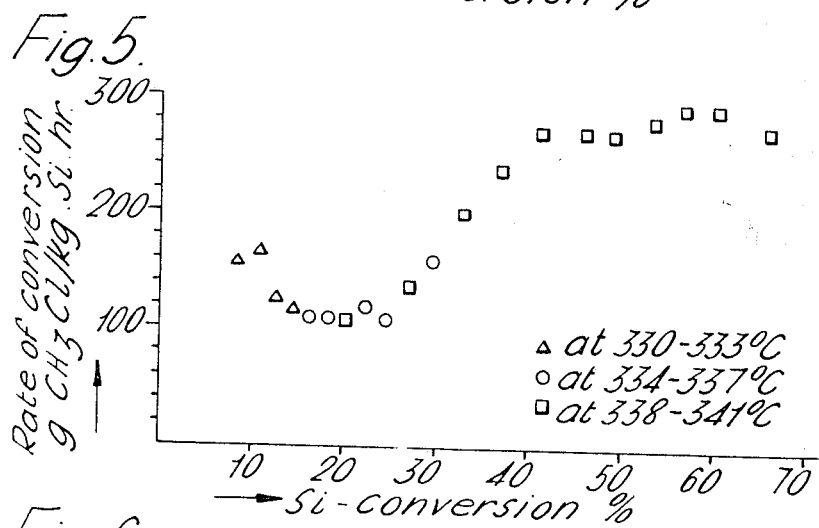

The general shape of the graphs of the results of the preceding example were obtained again but in a stronger degree (see FIGURE 3). After an initial decrease in selectivity to 73.2% $R_2SiX_2$ at 18.2% Si conversion (see FIGURE 5) this increased again and parallel therewith the reactivity. This initial decrease in selectivity could have been minimized by stabilization of the contact mass prior to reaction as appears from Example 3. At a conversion of 53% it even amounted to 92% $R_2SiX_2$. FIGURE 4 shows the percentages of $RSiX_3$ and $R_3SiX$ in the reaction product.

EXAMPLE 3

The contact mass consisted of 120 g. silicon, 12 g. cuprous chloride and 4 g. cadmium chloride (92.1% Si, 6.0% Cu and 1.9% Cd). The weight ratio cadmium:copper was 8:25.

The contact mass was prepared by heating for 0.5 hour at 365° C., 0.5 hour at 365° to 385° C. and 1.5 hours at 385° to 400° C.

The total yield of silanes in this test was 476 g.

Figure 6:
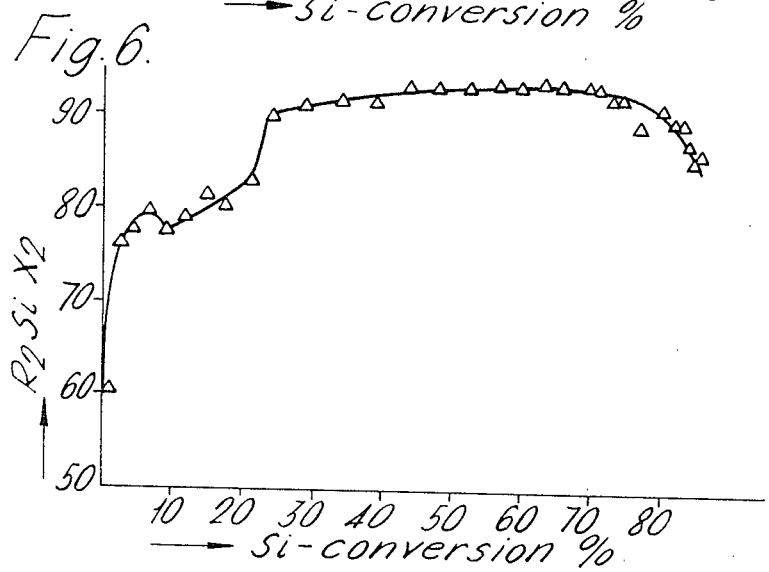

The results are illustrated in FIGURES 6, 7 and 8. The above results showed that the effect of heating the contact mass more strongly during its preparation was that the high selectivity was reached earlier with a maximum of nearly 94%.

It was also notable in this example that a good selectivity was maintained in spite of the high degree of consumption of the bed.

EXAMPLE 4

The contact mass consisted of 120 g. silicon, 12 g. cuprous chloride and 8 g. cadmium chloride (90.4% Si, 5.9% Cu and 3.7% Cd). The weight ratio cadmium:copper was 16:25.

The contact mass was prepared by heating for 1.3 hours at 350° C. and for 0.8 hour at 400° to 420° C., subsequently cooling to room temperature and 18 hours after that reacting with $CH_3Cl$.

The results are set out in Table IV.

TABLE IV

| Test period | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Hours after start | 0.5 | 1.0 | 1.5 | 2.0 | 2.5 | 3.0 | 4.0 | 5.0 | 6.0 | 7.0 | 8.0 | 9.0 | 10.0 | 11.0 | 11.8 |
| Temperature, °C | 332 | 328 | 330 | 330 | 330 | 330 | 332 | 332 | 331 | 331 | 331 | 340 | 350 | 351 | 350 |
| Production, g. silanes/hr | 2.24 | 7.62 | 8.48 | 7.70 | 7.24 | 6.98 | 7.27 | 7.00 | 5.95 | 6.79 | 6.04 | 1.79 | 9.88 | 9.36 | 9.95 |
| Composition $R_2SiX_2$, percent by wt | 54.8 | 58.9 | 61.1 | 59.9 | 60.0 | 61.8 | 61.4 | 62.5 | 67.9 | 62.9 | 61.9 | | 59.2 | 58.4 | 60.0 |
| Quantity of Si in the bed (g.) | 118.4 | | 117.0 | | 115.3 | | 113.3 | | 110.4 | | 107.6 | | 105.5 | | 101.3 |
| Rate of conversion, g. $CH_3Cl$/kg. Si/hr | 17 | 57 | 64 | 58 | 55 | 54 | 57 | 55 | 47 | 55 | 56 | 17 | 83 | 80 | 86 |
| Si coversion, percent | 0.1 | 0.6 | 1.3 | 2.0 | 2.7 | 3.4 | 4.4 | 5.7 | 6.8 | 8.0 | 9.2 | 10.0 | 11.0 | 12.7 | 14.5 |

The results are set out in Table III.

TABLE III

| Test period | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Hours after start | 0.5 | 1.13 | 1.76 | 2.51 | 3.26 | 4.01 | 4.76 | 5.51 | 6.26 | 7.3 | 8.3 | 9.3 | 10.3 | 11.3 | 12.3 | 13.3 |
| Temperature, °C | 325 | 328 | 328 | 333 | 334 | 335 | 334 | 335 | 335 | 335 | 336 | 335 | 335 | 333 | 332 | 332 |
| Production, g. silanes/hr | 10.5 | 16.4 | 17.2 | 17.6 | 17.6 | 18.8 | 22.6 | 20.1 | 22.4 | 25.6 | 29.1 | 27.0 | 29.1 | 21.3 | 22.0 | 27.2 |
| Composition $R_2SiX_2$, percent by wt | 60.5 | 76.4 | 77.8 | 79.7 | 77.5 | 79.0 | 81.5 | 80.6 | 83.0 | 90.0 | 91.0 | 91.4 | 91.3 | 92.7 | 92.8 | 92.7 |
| $RSiX_3$, percent by wt | 13.7 | 11.0 | 10.5 | 9.5 | 10.8 | 9.7 | 8.5 | 8.4 | 7.6 | 4.8 | 4.7 | 4.7 | 4.2 | 3.5 | 3.5 | 3.8 |
| $R_3SiX$, percent by wt | 18.8 | 12.6 | 11.7 | 10.8 | 11.7 | 11.3 | 10.0 | 11.0 | 9.4 | 5.2 | 4.0 | 3.5 | 3.9 | 3.1 | 3.2 | 3.2 |
| Quantity of Si in the bed (g.) | 118.2 | | 113.9 | | 108.1 | | 101.8 | | 93.8 | | 84.2 | | 72.1 | | 61.9 | |
| Rate of conversion, g. $CH_3Cl$/kg. Si/hr | 70 | 110 | 120 | 120 | 130 | 140 | 180 | 160 | 190 | 220 | 270 | 270 | 320 | 250 | 280 | 390 |
| Si conversion, percent | 0.5 | 1.9 | 4.1 | 6.5 | 9.0 | 11.5 | 14.3 | 17.3 | 21.0 | 24.1 | 29.1 | 34.3 | 39.3 | 44.0 | 47.9 | 52.5 |

| Test period | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| Hours after start | 14.3 | 15.3 | 16.3 | 17.3 | 18.3 | 19.3 | 20.3 | 21.3 | 22.3 | 23.3 | 24.3 | 25.3 | 26.3 | 27.3 | 28.1 |
| Temperature, °C | 328 | 331 | 335 | 330 | 328 | 332 | 327 | 337 | 340 | 340 | 320 | 325 | 338 | 340 | 342 |
| Production, g. silanes/hr | 19.2 | 17.3 | 18.4 | 17.3 | 12.4 | 17.3 | 12.5 | 17.9 | 17.0 | 18.6 | 12.2 | 8.2 | 5.5 | 5.4 | 5.8 |
| Composition $R_2SiX_2$, percent by wt | 93.2 | 93.3 | 93.7 | 93.3 | 93.6 | 93.2 | 91.8 | 91.8 | 88.8 | 90.8 | 89.7 | 89.2 | 87.1 | 85.3 | 6.0 |
| $RSiX_3$, percent by wt | 3.7 | 3.6 | 3.2 | 3.3 | 3.3 | 3.4 | 4.0 | 3.5 | 5.5 | 4.7 | 5.1 | 4.6 | 5.6 | 6.8 | 85.9 |
| $R_3SiX$, percent by wt | 2.8 | 2.6 | 2.7 | 3.0 | 2.5 | 2.9 | 3.3 | 3.5 | 4.4 | 4.2 | 4.5 | 5.8 | 6.1 | | 6.6 |
| Quantity of Si in the bed (g.) | 51.5 | | 43.6 | | 36.6 | | 31.6 | | 26.6 | | 21.0 | | 18.1 | | 15.9 |
| Rate of conversion, g. $CH_3Cl$/kg. Si/hr | 290 | 290 | 330 | 340 | 270 | 290 | 210 | 310 | 550 | 410 | 310 | 220 | 230 | 270 | 300 |
| Si conversion, percent | 56.7 | 60.0 | 63.3 | 66.5 | 69.8 | 71.5 | 73.4 | 75.0 | 77.6 | 80.6 | 82.3 | 83.7 | 84.8 | 85.7 | 86.6 |

The results are illustrated in FIGURES 9 and 10.

EXAMPLE 5

The contact mass consisted of 120 g. silicon, 12 g. cuprous chloride and 3 g. cadmium chloride (92.6% Si, 6.0% Cu and 1.4% Cd). The weight ratio cadmium:copper was 23.9:100.

The contact mass was prepared by heating for 2.5 hours at 355° C. and for 11.3 hours at 385° C.

The results are set out in Table V.

Figure 12:
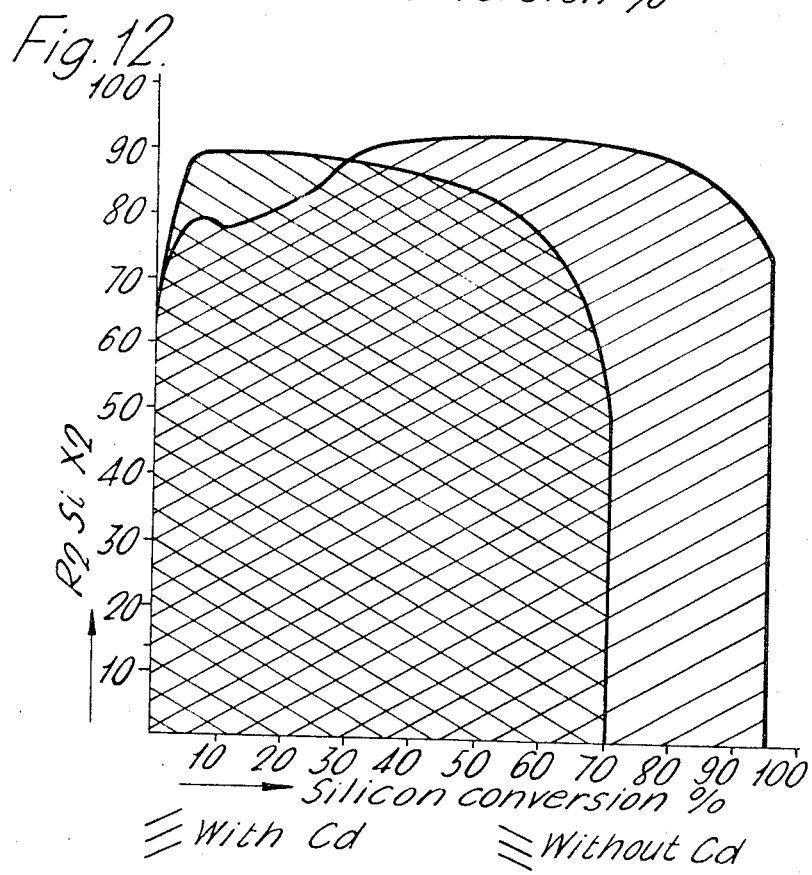

The results given in Table VI and FIGURE 12 show that the overall yield in the case of the process without cadmium was about 58% silicon conversion into $R_2SiX_2$. In the case of the process with cadmium the overall yield was about 83% silicon conversion into $R_2SiX_2$.

In the case of the example with cadmium (Example 3) the reaction was terminated when an overall conversion of silicon into silanes of 87% was reached. At that time the rate of conversion (r) was still as high as 300 g. $CH_3Cl/kg$. Si/hr. It is estimated that an overall conver-

TABLE V

| Test period | 1 | 2 | 3 | 4 | 5 | 6 | 7 | 8 | 9 | 10 | 11 | 12 |
|---|---|---|---|---|---|---|---|---|---|---|---|---|
| Hours after start | 0.9 | 1.3 | 2.0 | 2.6 | 3.2 | 3.9 | 4.7 | 5.6 | 6.5 | 7.5 | 8.5 | 9.5 |
| Temperature, ° C | 320 | 332 | 329 | 331 | 332 | 333 | 334 | 335 | 336 | 335 | 335 | 336 |
| Production, g. silanes/hr | 9.2 | 15.3 | 15.0 | 15.4 | 16.2 | 18.9 | 19.7 | 19.7 | 19.6 | 17.6 | 18.7 | 18.5 |
| Composition $R_2SiX_2$, percent by wt | 67.7 | 81.3 | 86.0 | 87.7 | 89.9 | 90.1 | 90.5 | 90.1 | 92.9 | 91.8 | 92.3 | 93.1 |
| Si conversion, percent | 0.7 | 2.1 | 3.5 | 5.0 | 6.6 | 8.9 | 11.6 | 14.7 | 17.9 | 21.1 | 24.3 | 27.6 |

| Test period | 13 | 14 | 15 | 16 | 17 | 18 | 19 | 20 | 21 | 22 | 23 | 24 |
|---|---|---|---|---|---|---|---|---|---|---|---|---|
| Hours after start | 10.5 | 11.5 | 12.7 | 13.9 | 15.0 | 16.2 | 17.6 | 18.9 | 20.3 | 21.8 | 23.3 | 25.4 |
| Temperature, ° C | 336 | 335 | 335 | 335 | 340 | 345 | 338 | 339 | 342 | 344 | 343 | 341 |
| Production, g. silanes/hr | 18.2 | 17.2 | 16.2 | 14.6 | 17.2 | 22.4 | 12.2 | 11.6 | 14.2 | 13.8 | 13.3 | 7.2 |
| Composition $R_2SiX_2$, percent by wt | 89.0 | 93.0 | 89.1 | 88.4 | 89.2 | 89.5 | 86.4 | 86.7 | 87.8 | 89.0 | 89.1 | 83.4 |
| Si conversion, percent | 31.0 | 34.2 | 37.5 | 40.9 | 44.2 | 48.5 | 52.6 | 55.4 | 58.6 | 62.3 | 66.0 | 69.3 |

In this experiment an amount of 34.8 g. silicon remained in the bed at an Si conversion of 70.7%. The total yield of silanes was 386 g.

Figure 11:
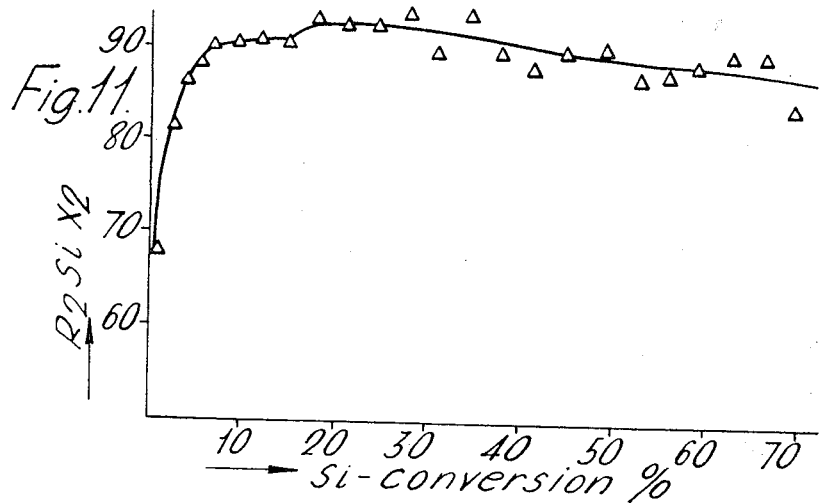

The results are illustrated in FIGURE 11. It was notable in this experiment that owing to the stabilization of the contact mass even when there was only 6.6% Si conversion a selectivity of 90% $R_2SiX_2$ was reached. At the end of the test the cadmium:copper ratio was 7:100 while in the case of Example 2 the ratio was 6.3:100.

The decrease in the cadmium content of the contact mass during the tests was due to the abrasion between the particles of the contact mass as analysis of the dust formed by the fluidization showed.

At the beginning of each test much $R_3SiX$ was formed. This may point to an excess of cadmium in the contact mass reacting with $CH_3Cl$, by which $CdCl_2$ and $R_3SiX$ develop.

For the reaction in the tests of Examples 1 to 5 about 90 g. $CH_3Cl/hr$. was passed through the reactor.

In order to illustrate the effect of cadmium more comprehensively a comparison is made of an example without cadmium. This contact mass contained about 90% of silicon, 10% of copper 0.1% of zinc and 0.05% of aluminium (Table VI and Example 3).

sion of silicon into silanes of at least 95% is attainable here before the rate of conversion would be smaller than 20 g. $CH_3Cl/kg$. Si/hr. which rate of conversion would no longer be of practical importance. The amount of $R_2SiX_2$ then obtained as estimated by graphical extrapolation (cf. FIG. 12) would have been about 84%.

Upon comparison of Example 3 and Example 5 (Table VI) it is evident that stabilization by heating of the contact mass leads to more selective formation of $R_2SiX_2$ especially in the first phase of the process.

EXAMPLE 6

The contact mass consisted of 60 g. silicon, 5.6 g. cuprous chloride and 0.62 g. cadmium chloride (93.7% Si, 5.66% Cu and 0.60% Cd). The weight ratio cadmium:copper was 10.6:100.

The contact mass was prepared and stabilized by heating for 2.5 hours at 350° C. and 16 hours at 145° C.

The process was carried out by passing 36 g. $CH_3Cl/hr$. over the contact mass in a fixed bed.

In this experiment the cuprous chloride and cadmium chloride had previously been fused in the desired ratio at 450° C. in an atmosphere of hydrogen chloride. After

TABLE VI

| | Example without Cd | | Example 3 | | | Example 5 | | |
|---|---|---|---|---|---|---|---|---|
| | (r) (327° C.) | Percent $R_2SiX_2$ | (r) | T.,° C. | Percent $R_2SiX_2$ | (r) | T.,° C. | Percent $R_2SiX_2$ |
| Si-conversion, percent: | | | | | | | | |
| 10 | 90 | 89 | 130 | 334 | 78 | 150 | 333 | 90 |
| 20 | 100 | 88 | 190 | 335 | 83 | 170 | 335 | 92 |
| 30 | 110 | 87 | 270 | 336 | 91 | 180 | 336 | 89 |
| 40 | 110 | 86 | 320 | 335 | 91 | 200 | 335 | 88 |
| 50 | 80 | 82 | 280 | 332 | 93 | 320 | 345 | 90 |
| 60 | 40 | 75 | 290 | 331 | 93 | 250 | 342 | 88 |
| 70 | Reaction stops | | 270 | 328 | 94 | 200 | 341 | 83 |
| 80 | | | 410 | 340 | 91 | | | |
| 87 | | | 300 | 342 | 86 | | | | cooling, the mass was pulverised and finally passed through a sieve of 75μ mesh.

The results are set out in Table VII.

TABLE VII

| Test Period | 1 | 2 | 3 | 4 | 5 | 6 | 7 | 8 | 9 | 10 | 11 | 12 | 13 |
|---|---|---|---|---|---|---|---|---|---|---|---|---|---|
| Hours after start | 1.0 | 2.0 | 3.0 | 4.0 | 5.0 | 6.0 | 7.0 | 8.0 | 8.7 | 9.7 | 10.7 | 21.7 | 12.5 |
| Temperature, ° C | 304 | 303 | 306 | 306 | 296 | 302 | 302 | 300 | 313 | 300 | 290 | 290 | 310 |
| Production, g. silanes/hr | 5.7 | 7.7 | 9.2 | 7.7 | 9.4 | 4.5 | 5.4 | 7.0 | 17.5 | 6.2 | 4.8 | 5.2 | 12.1 |
| Composition $R_2SiX_2$, percent by wt | 70.9 | 77.5 | 82.1 | 86.7 | 86.1 | 89.3 | 91.1 | 90.5 | 72.1 | 84.1 | 90.6 | 89.2 | 82.2 |
| Si conversion, percent | 1.0 | 3.5 | 6.6 | 9.6 | 12.8 | 15.3 | 17.1 | 19.9 | 22.0 | 25.4 | 27.5 | 29.3 | 32.1 |

EXAMPLE 7

The contact mass consisted of 60 g. silicon, 10 g. cuprous chloride and 3 g. cadmium chloride (87.8% Si, 9.5% Cu and 2.7% Cd). The weight ratio cadmium: copper was 28.4:100.

The contact mass was prepared by heating at 350°–420° C. for 2.0 hours. The experiment was carried out in a fixed bed at 435°–445° C., while passing gaseous phenyl chloride over the contact mass with the aid of nitrogen.

For a period of 31 hours, 20 g. phenyl chloride/hr. was passed through. More than 20% of the phenylchloride was converted into phenyltrichlorosilane, biphenyl- and diphenyldichlorosilane. The composition of the product as appears from gas/liquid chromatography was: 78% diphenyldichlorosilane, 17% phenyltrichlorosilane and 5% biphenyl. The weight ratio $RSiCl_3:R_2SiCl_2$ was consequently 22:100.

In a similar experiment under analogous conditions *without cadmium* the conversion was very low (<10%) the weight ratio $RSiCl_3:R_2SiCl$ being >1:1.

I claim:

1. A process for the preparation of lower alkyl or aryl halogenosilanes by reacting a lower alkyl or aryl halide at an elevated temperature with a contact mass containing silicon, a copper or silver catalyst and a promoter in which cadmium is used as a promoter for the production of diorganodihalogenosilanes in increased yield.

2. A process as claimed in claim 1 in which the contact mass contains silicon, copper and cadmium within the weight ratios Cu:Si between 1:150 and 9:11 and Cd:Cu between 1:100 and 3:5.

3. A process as claimed in claim 2 in which the contact mass is prepared by adding to the silicon a powdered fused mixture of cuprous halide and cadmium halide followed by a heat treatment at a temperature between 250° and 450° C. for 2 to 40 hours prior to the reaction with the lower alkyl or aryl halide.

4. A process as claimed in claim 1 in which the contact mass contains silicon, copper and cadmium within the weight ratios Cu:Si between 1:100 and 1:10 and Cd:Cu between 6:100 and 3:8.

5. A process as claimed in claim 4 in which the contact mass is prepared by adding to the silicon a powdered fused mixture of cuprous halide and cadmium halide followed by a heat treatment at a temperature between 320° and 400° C. for 2 to 10 hours prior to the reaction with the lower alkyl or aryl halide.

6. A process according to claim 1 in which the lower alkyl or aryl halide is a $C_1$–$C_3$ alkyl chloride or bromide.

7. A process as claimed in claim 3 in which the contact mass is stabilized by heating it to a temperature between 320° and 400° C. for 2 to 10 hours prior to the reaction with the lower alkyl or aryl halide.

8. A process as claimed in claim 1 in which the reaction is carried out at temperatures between 150 and 600° C.

9. A process as claimed in claim 8 in which the lower alkyl or aryl halide is an alkyl halide and the reaction with the contact mass is carried out at temperatures between 150° and 480° C.

10. A process as claimed in claim 9 in which the temperatures are between 240° and 380° C.

11. A process as claimed in claim 10 in which the lower alkyl or aryl halide is methyl chloride.

12. A process as claimed in claim 8 in which the lower alkyl or aryl halide is an arylhalide and the reaction with the contact mass is carried out at temperatures between 250° and 600° C.

13. A process as claimed in claim 12 in which the temperatures are between 330° and 500° C.

14. A process as claimed in claim 13 in which the lower alkyl or aryl halide is phenyl chloride.

15. A process as claimed in claim 9 in which the pressure during the reaction is between 0.1 and 20 kg./cm.$^2$.

16. A process as claimed in claim 12 in which the pressure during the reaction is between 0.1 and 20 kg./cm.$^2$.

17. A contact mass for use in the production of lower alkyl or aryl halogenosilanes in which the relative quantities of silicon copper and cadmium calculated as parts by weight of pure metal are within the following ratios:

Cu:Si between 1:150 and 9:11
Cd:Cu between 1:100 and 3:5

18. A contact mass as claimed in claim 17 in which the ratios are: Cu:Si between 1:100 and 1:10 Cd:Si between 6:100 and 3:8.

References Cited

UNITED STATES PATENTS 3,155,698    11/1964    Nitzsche et al. _____ 260—448.2

TOBIAS E. LEVOW, *Primary Examiner.*

J. P. PODGORSKI, *Assistant Examiner.*

U.S. Cl. X.R.

252—441, 475

PO-1050
(5/69)

UNITED STATES PATENT OFFICE
CERTIFICATE OF CORRECTION

Patent No. 3,446,829            Dated May 27, 1969

Inventor(s) Hendrik Frits Zock

It is certified that error appears in the above-identified patent and that said Letters Patent are hereby corrected as shown below:

Columns 3-4, Table I, column 7, "82.2" should be --82.8--; Columns 5-6, Table IV is out of sequence; Columns 5-6, Table IV, column 9, "67.9" should be --67.0--; Columns 7-8, Table V, column 5, "89.9" should be --89.8--; Column 8, line 31, "84%" should be --83%--; Columns 7-8, Table VI, in the heading "(r)" (three occurrences) should be --r--; Columns 7-8, Table VII, column 12, "21.7" should be --11.7--.

SIGNED AND SEALED
MAR 24 1970

(SEAL)
Attest:

Edward M. Fletcher, Jr.
Attesting Officer

WILLIAM E. SCHUYLER, JR.
Commissioner of Patents